United States Patent [19]

Herrouin et al.

[11] Patent Number: 4,471,849
[45] Date of Patent: Sep. 18, 1984

[54] VEHICLES TRAVELLING ON AIR CUSHIONS

[75] Inventors: Guy Herrouin; André Lafont, both of Paris; Serge Cruchant, Bagneux, all of France

[73] Assignee: Societe d'Etudes Et De Developpement Des Aeroglisseurs Amphibies, S.E.D.A.M., Paris, France

[21] Appl. No.: 426,275

[22] Filed: Sep. 29, 1982

[30] Foreign Application Priority Data

Dec. 29, 1981 [FR] France .................. 81 24406

[51] Int. Cl.³ .................................. B60V 1/16
[52] U.S. Cl. ............................................. 180/127
[58] Field of Search ................... 180/127, 128, 116

[56] References Cited

U.S. PATENT DOCUMENTS

| 4,042,060 | 8/1977 | Bertin et al. | 180/127 |
| 4,060,147 | 11/1977 | Guienne et al. | 180/127 |
| 4,396,082 | 8/1983 | Herrouin et al. | 180/127 |

FOREIGN PATENT DOCUMENTS

| 1294824 | 5/1969 | Fed. Rep. of Germany | 180/128 |
| 2281251 | 3/1976 | France . | |
| 2301422 | 9/1976 | France . | |
| 2465624 | 3/1981 | France . | |

*Primary Examiner*—Joseph F. Peters, Jr.
*Assistant Examiner*—Kenneth R. Rice

[57] ABSTRACT

An air cushion vehicle comprising a structure to be lifted, a central lifting cushion and a peripheral lifting arrangement including a plurality of lifting cells defined externally by an outer multilobed skirt. Each lobe of the outer skirt comprises an upper part defined by a surface of revolution which is slanted downwardly and outwardly with respect to the structure, and a lower part defined by a surface of revolution which is slanted downwardly and inwardly with respect to the structure, so that the lobe projects outwardly of the periphery of the structure. According to the invention, the upper part is defined by at least two surfaces of revolution having respective axes of revolution coplaner with a vertical plane containing the axis of revolution of the lower part. The respective axes of revolution of said surfaces are inclined with respect to the vertical and each two adjacent surfaces of the upper part are connected along an associated plane of connection which substantially bisects the angle between the axes of revolution of these surfaces.

5 Claims, 4 Drawing Figures

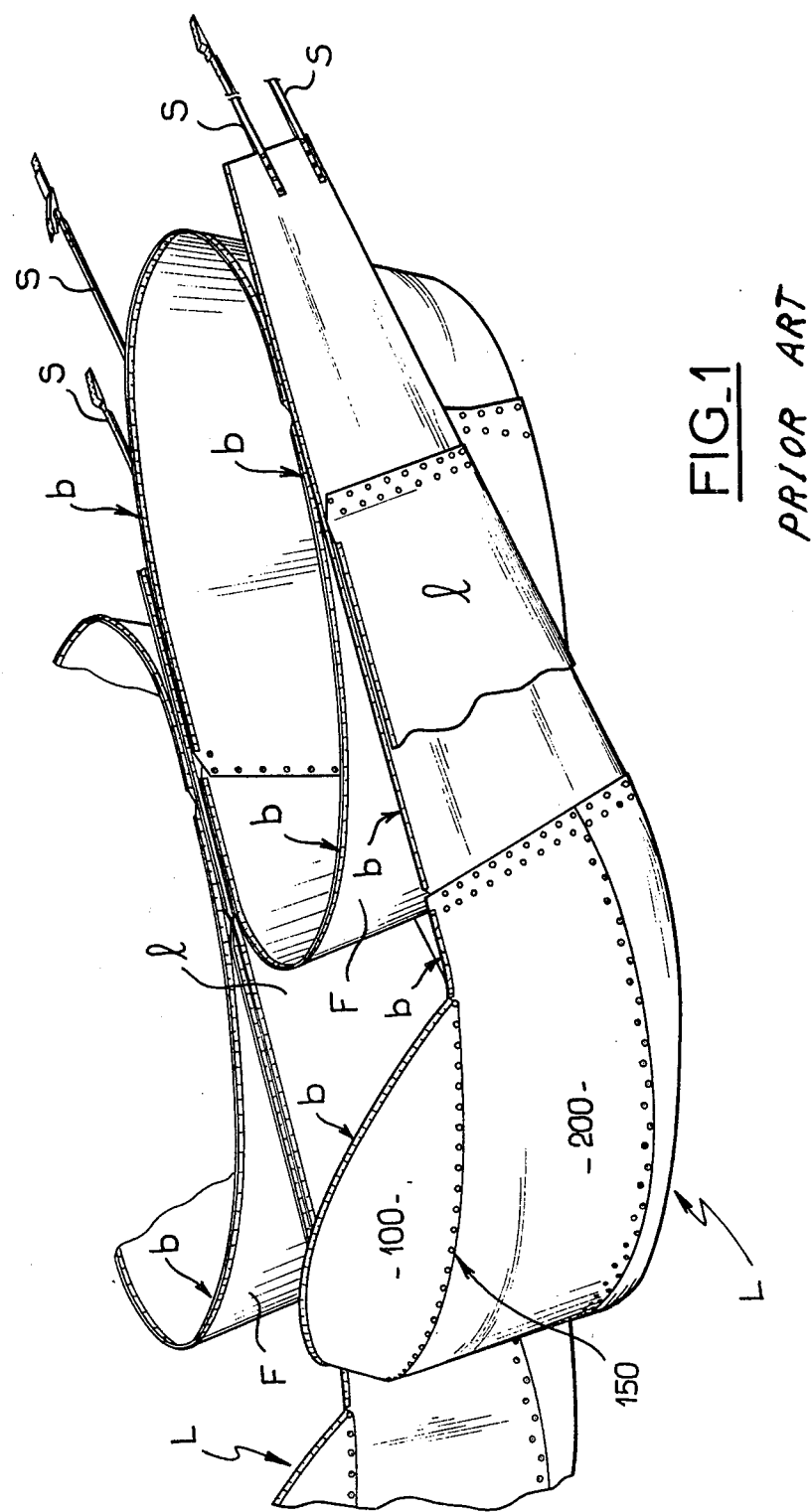
FIG_1 *PRIOR ART*

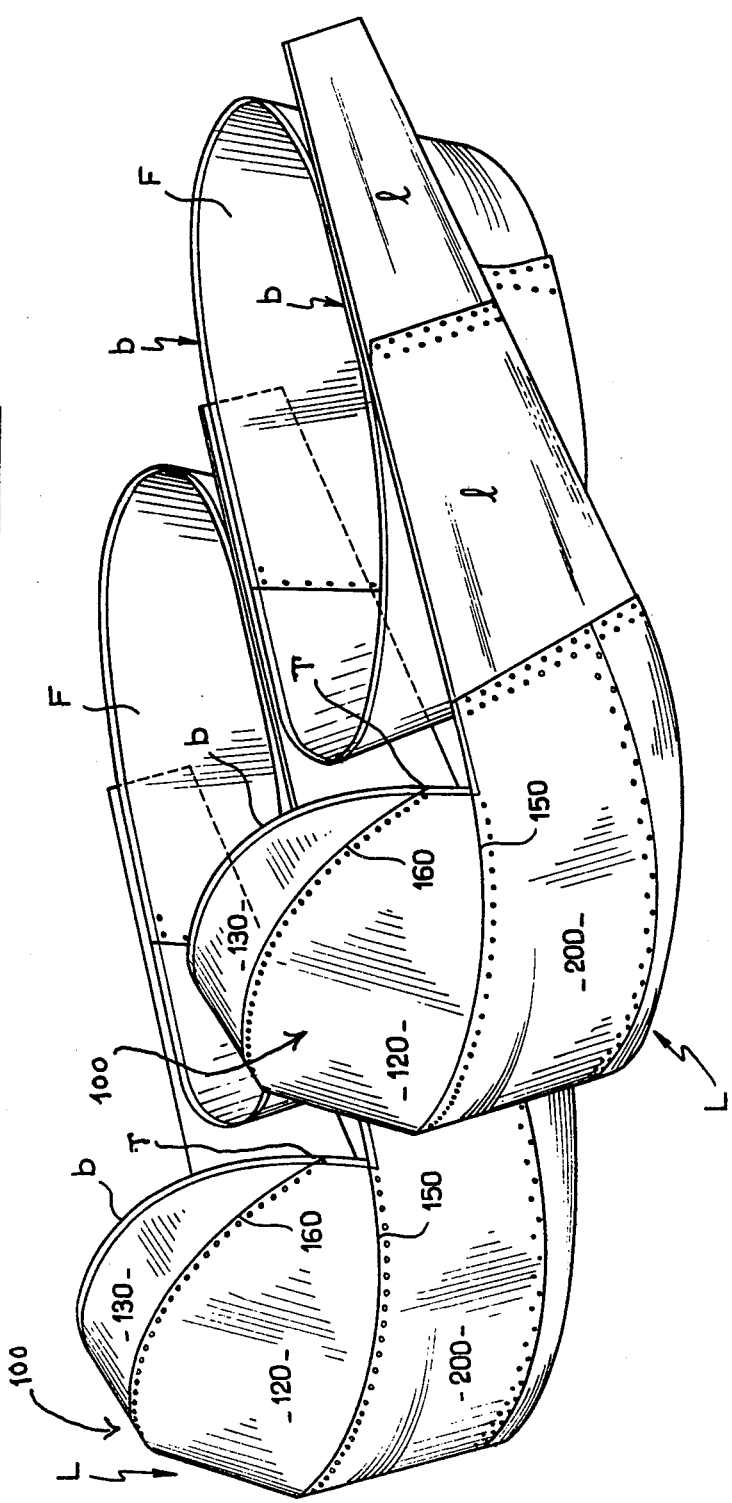
FIG_3

VEHICLES TRAVELLING ON AIR CUSHIONS

RELATED APPLICATIONS

The present invention relates to vehicles or machines travelling on cushions of pressurized fluid, also known as ground effect machines and constitutes an improvement in ground effect vehicles or machines of the type shown by French Patent application 2465624 (No. 79 23213)of Sept. 18th 1979.

SUMMARY OF THE INVENTION

Hereafter, in order to simplify the explanation, mention will be made solely of vehicles travelling on air cushions, without this expression being limiting.

More precisely, the present invention relates to vehicles travelling on air cushions of the type described in one or the other of two French Patents 74 27139 (2,281,251) filed on Aug. 5th 1974 and 75 04960 (2,301,422) filed on Feb. 18th 1975.

These two patents are mentioned here as a reference, it being understood that one could refer to the latter for a full understanding of the present description.

Even more precisely, the present invention relates to vehicles travelling on air cushions of the type in which the lift of a structure is ensured by a plurality of air cushions defined by flexible skirts, which define a central lift cushion and a peripheral arrangement comprising a plurality of adjacent closed cells (or compartments) defined externally by an outer skirt constituted by a plurality of adjacent lobes, in which each lobe is constituted by the assembly of an upper part which diverges in the downwards direction with respect to the structure and of a lower part, which converges in the downwards direction with respect to the structure, so that the lobe arrangement projects outside said structure. Hereafter, in order to simplify the explanation, it will be stated solely that these vehicles comprise an outer "multilobed" skirt.

BRIEF DESCRIPTION OF DRAWINGS

The specific details of the invention will be described in conjunction with the accompanying drawings wherein:

FIG. 1 is a perspective elevational view of one of the skirt lobes as formed in the prior art;

FIG. 3 is a perspective view of the skirt lobes of the invention; and

DETAILED DESCRIPTION

Figure 2:
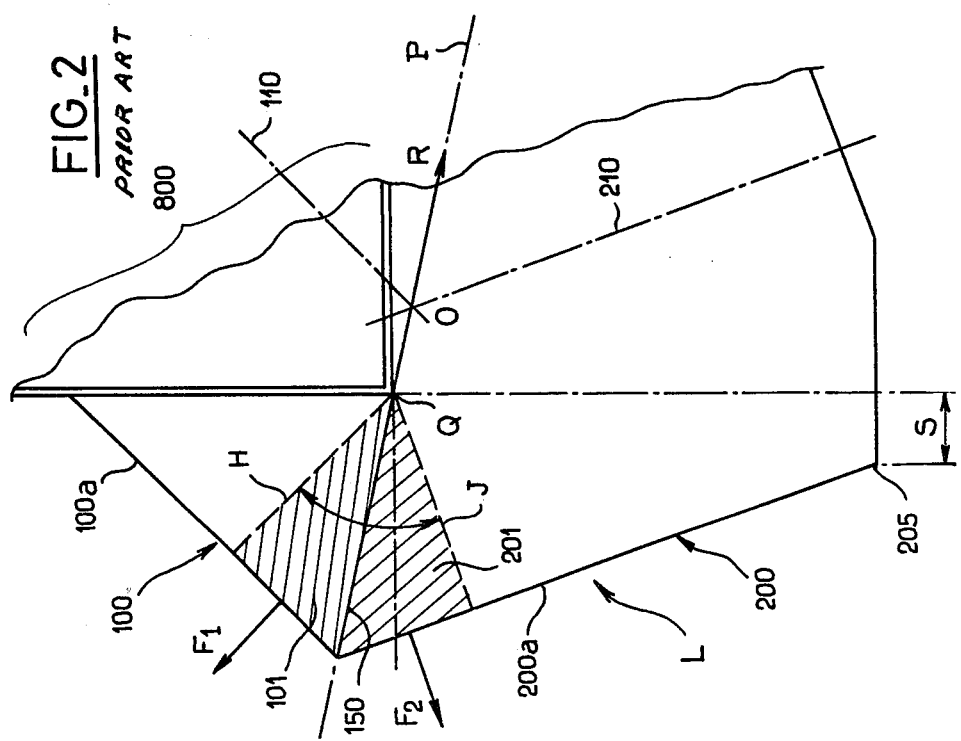
FIG. 2 is a diagram showing the geometry of the prior art skirt of FIG. 1.

FIGS. 1 and 2 of the accompanying drawings illustrate a vehicle travelling on air cushions of the type described in French Patent application 2465624 (No. 79 23213) of Sept. 18th 1979, the accompanying FIGS. 1 and 2 being similar to FIGS. 1 and 2 of the aforesaid patent application, showing the prior art which is here being improved upon, as can be seen by comparing FIG. 1 to FIG. 3.

FIG. 1 shows one of the cells of the peripheral arrangement of a vehicle travelling on air cushions of the previously described type. A cell of this type comprises an outer skirt constituted by a plurality of lobes such as L. Each lobe surrounds a preferably cylindrical or frustoconical skirt F (closed or otherwise) laterally, whilst being bilaterally tangential to the latter, in a sufficient area to ensure a seal. As shown, each lobe L has an arcuate shape, the sides 1 of the lobes being kept under tension by straps S or similar members. The upper edge b of the skirts is naturally connected in a sealed manner to the structure of the platform.

Each lobe is constituted by the assembly of an upper part 100 and of a lower part 200, connected along a flat connecting curve 150. As shown clearly in FIG. 1, the part 100 diverges in a downwards direction from the centre of the lobe, whereas the part 200 converges towards the latter: the entire lobe thus has a projecting shape, the connecting curve 150 constituting the area having the greatest flare.

It is easy to understand that an outer skirt of this type provided on vehicles travelling on air cushions has two important advantages: first of all and this is the main advantage, the projecting nature of the lobes increases the surface of the cells or compartments which these lobes define. The lift surface (section of the cells or compartments) is considerably increased with respect to previously proposed solutions, for virtually unchanged dimensions of the platform of the structure.

On the other hand and this is particularly important for vehicles intended to travel at sea, the projecting part of the lobes constitutes a protective pneumatic girdle all around the vehicle, which is effective against the impact and in particular against the impact of waves.

FIG. 2 shows diagrammatically the geometric definition of the two parts 100 and 200 of the lobe L suspended from a support structure 800. The lower part 200 and upper part 100 as defined in French Patent Application 2465624 (No. 79 23213) are formed by two surfaces of revolution about respective axes 210,110 and are similar, i.e. cylindrical surfaces of the same radius or frustoconical surfaces of the same conicity. These axes of revolution 210 and 110 intersect at a point 0 and are located in the same vertical plane which corresponds to the plane of FIG. 2. As shown in this figure, the upper part 100 and the lower part 200 are connected along a curve 150 located in a plane P perpendicular to the plane of FIG. 2, which is also a plane bisecting the angle formed by the aforesaid axes of revolution 110 and 210. Consequently, the plane P containing the connecting curve 150 is also a plane bisecting the angle formed by the two generatrices 100a and 200a located in the plane of FIG. 2 and belonging respectively to the upper part 100 and to the lower part 200.

In such a context, one essential condition for the stability of the complex skirt defined in French Patent application 2465624 (No. 79 23213) is that the bisecting plane P containing the connecting curve 150 does not pass outside the support structure 800. At the limit, the plane P in question may simply be tangential to the bottom of the structure.

In fact, it will be understood that the reaction force due to the force $F_1$ exerted by the pressurised air on the shaded portion 101 of the upper part 100, defined by the plane H perpendicular to the axis of revolution 110 of said upper part 100, is exerted in the vicinity of the connecting curve 150, on the lower part 200. Similarly, the reaction force due to the force $F_2$ exerted by the pressurised air on the shaded portion 201 of the lower part 200, defined by the plane J perpendicular to the axis of revolution 210 of said lower part 200, is exerted in the vicinity of the connecting curve 150 on the upper part 100. The two forces $F_1$ and $F_2$ are of the same amplitude, since the shaded portions 101 and 201 have equal surfaces, in view of the fact that the plane B containing the connecting curve 150 constitutes a plane bisecting the angle formed by the two said generatrices 100a and 200a and that the lower part 200 and upper part 100 are similar (cylindrical parts of the same radius or frustoconical parts of the same conicity).

Consequently, the resultant R of the said reaction forces, due to the forces $F_1$ and $F_2$ is exerted in the plane P containing the connecting curve 150 and thus, to the extent that the plane P intersects the support structure 800, in the vicinity of the points Q connecting the lobe L to the structure 800, which are situated in the plane P containing said connecting curve 150.

In the opposite case, if the plane P does not intersect the support structure 800, but passes below the latter, the points Q of application of the resultant R will not be situated in the vicinity of the connection of the skirt to the structure 800, but in the flexible material forming the envelope of the skirt itself, which will thus be the seat of internal stresses.

However, the Applicant has established that in lobes L according to a prior art of this type, said resultant R of the reaction forces, at the intersection of the bisecting plane P and of the support structure 800 could assume very high values which are particularly harmful and unacceptable for machines of large dimensions, in which the skirts have a large diameter.

Despite the important advantages provided by skirts having a projecting structure (lift surface considerably increased for the same platform and pneumatic protective girdle) one was hitherto inclined to abandon such a structure for machines of large dimensions.

The present invention now proposes a new type of skirt which resolves the problem posed whilst retaining the aforementioned advantages.

The present invention proposes an improvement to vehicles travelling on air cushions according to French Patent Application 2465624 (No. 79 23213), which improvement reduces the resultant R of the aforesaid reaction forces very appreciably.

In this improvement there is provided according to the invention a vehicle travelling on air cushions comprising a lifted structure, a central lift cushion and a peripheral lift arrangement comprising a plurality of cells defined externally by an outer multilobed skirt, in which each lobe of the outer skirt is constituted by the assembly of an upper part which diverges in the downwards direction with respect to the structure and of a lower part which converges in the downwards direction with respect to the structure, so that the arrangement of the lobe projects outside the structure, said upper part being formed by at least two surfaces of revolution whereof the axes of revolution are situated in the vertical plane containing the axis of revolution of the lower part and have different inclinations with respect to the vertical, according to an order of inclination increasing for the said surfaces of revolution forming the upper part, taken in the upwards direction, from the lower part to the lifted structure.

The surfaces of revolution composing the upper part may be formed by cylindrical or frustoconical surfaces.

All adjacent surfaces of revolution composing the upper part and the lower part of a lobe may be connected along a connecting plane which constitutes the plane bisecting the angle formed by the respective axes of revolution of these two surfaces.

Each connecting plane may intersect the structure whilst being at least tangential to the floor of the latter.

Figure 4:
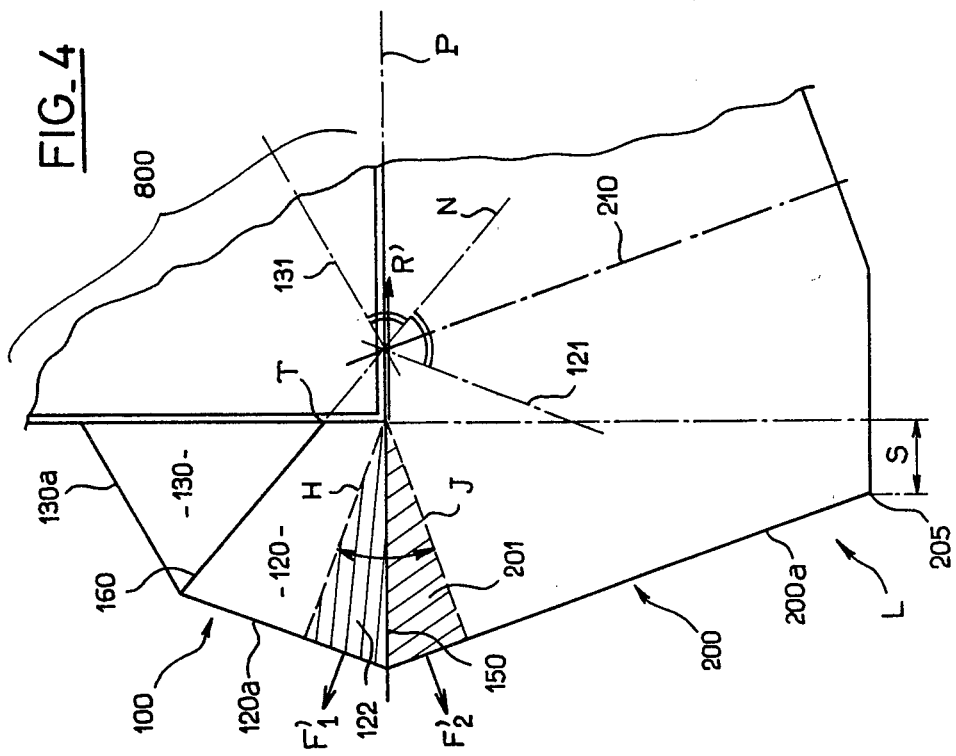
FIG. 4 is a diagram showing the geometry of this new skirt.

Further features and advantages of the invention will become apparent on reading the ensuing description of the invention described, by way of example, with reference to FIGS. 3 and 4 of the accompanying drawings in which FIG. 3 shows two cells of the peripheral arrangement of a vehicle travelling on air cushions according to the invention and FIG. 4 shown diagrammatically the geometric definition of the upper part 100 of the lobe L suspended from a support structure 800 of a vehicle according to the invention.

FIGS. 3 and 4 show the upper part 100 and the lower part 200 of the lobe L. The upper part 100 is formed by two surfaces of revolution 120 and 130, whereof the respective axes of revolution 121,131 are disposed in the vertical plane containing the axis of revolution 210 of the lower part 200 (plane of FIG. 4). The upper part 100 and the lower part 200 are connected along a flat curve 150 situated in a plane P perpendicular to the plane of FIG. 4 and which constitutes the plane bisecting the angle formed by the axes of revolution 210 and 121 and in fact of the angle formed by the generatrices 200a and 120a contained in the plane of FIG. 4.

The axis of revolution 131 of the (higher) surface of revolution 130 adjacent the structure 800 has an inclination with respect to the vertical greater than the inclination of the axis of revolution 121 of the (lower) surface of revolution 120 adjacent the lower part 200.

The two surfaces 120 and 130 are connected along a flat curve 160 situated in a plane N perpendicular to the plane of FIG. 4. As shown in this figure, the plane N containing the connecting plane 160 is a plane bisecting the angle formed by the respective axes of revolution 121 and 131 of the said members of revolution 120 and 130. Similarly, the plane N is a plane bisecting the angle formed by the two generatrices 120a and 130a situated in the plane of FIG. 4, which below respectively to the surfaces of revolution 120 and 130.

The angles formed on the one hand between the generatrices 120a and 200a, on the other hand between the generatrices 120a and 130a, are clearly greater than the angle formed by the generatrices 100a and 200a in FIG. 2.

Thus, it is quite clear that the resultant R' of the reaction forces due to the forces $F'_1$ and $F'_2$ produced by the pressurised air on the shaded portions 122 and 201, defined respectively on the member of revolution 120 and the lower part 200, by the planes J and H perpendicular to the axes of revolution 121 and 210 of the member of revolution 120 and of the lower part 200, is very clearly less than the resultant R of the reaction forces, shown in FIG. 2. In fact, the shaded surfaces 122 and 201 illustrated in FIG. 4 are very clearly less than the corresponding shaded surfaces 101 and 201 shown in FIG. 2.

The same is naturally true for the resultant of the reaction forces exerted at the points T connecting the lobe L to the structure 800, which are situated in the plane N containing the connecting curve 160, which resultant is due to the forces applied to the portions of members 120 and 130, defined by planes perpendicular to the axes of revolution 121 and 131.

In other words, according to the present invention, by modifying the structure of the lobe L, the points of application of the resultants of the reaction forces are multipled, so that each of the resultants is less than the resultant of the reaction forces produced on a lobe according to the previous state of the art.

Naturally, it will be understood that each of the connecting planes (150,160) between two adjacent surfaces (200,120; 120,130) comprising a lobe (L) according to the present invention, a connecting plane which constitutes the plane bisecting the angle formed by the two axes of revolution (210,121; 121,131) of the surfaces in question, should intersect the support structure 800, thus being at least tangential to the floor of said structure so that the points of application of the reaction forces correspond to the connecting points of the lobe L to the structure 800.

The surfaces 120 and 130 composing the upper part 100 must be similar to the lower part 200, i.e. cylindrical parts of the same radius or frustoconical parts of the same conicity.

To the extent that the angles formed on the one hand between the generatrices 120a and 130a (surfaces of revolution 120 and 130), on the other hand between the generatrices 120a and 200a (surfaces of revolution 120 and lower part 200) are equal, as illustrated in FIG. 4, the point of intersection between the plane N containing the connecting curve 160, the axis of revolution 121 and the axis of revolution 131, coincides with the point of intersection 0 between the plane P containing the connecting curve 150, the axis of revolution 210 and the axis of revolution 121. In this case, the inclination of the axis 131 with respect to the axis 210 corresponds to twice the inclination of the axis 121 with respect to this same axis 210.

Naturally, it is possible to give the aforesaid angles different values, in which case the points of intersection no longer coincide.

The arrangement according to the present invention has the advantage on the one hand of limiting the angles of connection between the various surfaces of revolution (200,120,130), forming the lobe L, on the other hand of making it possible to connect the upper edge of the skirt to any height of the support structure 800.

It should be noted that with equal bottom skirt surfaces S, (by bottom skirt surface S one means the surface defined in a horizontal plane by the lower leakage edge 205 of the lobe and the vertical extension of the terminal edge of the support structure 800), by virtue of the present invention, the reaction forces at the intersection of the aforesaid bisecting planes and of the structure are reduced very noticeably, whilst maintaining the advantages inherent in the projecting lobes described in French Patent Application 2465624 (lift surface considerably increased for the same platform and pneumatic protective girdle)

Naturally, the present invention is not limited to the embodiment which has been described and of which numerous variations can be conceived without diverging from the scope of the present invention. In particular, a lobe L has been described and illustrated, whereof the upper part 100 is formed by two surfaces 120 and 130 connected along a curve 160, however the present invention could be generalised with lobes whereof the upper part 100 could comprise a multiplicity of members similar to the afore-described surfaces 120 and 130.

What is claimed is:

1. An air cushion vehicle comprising:
   a structure to be lifted;
   a central lifting cushion means; and
   a peripheral lifting arrangement including a multilobed skirt;
   each lobe of the skirt extending outwardly of the periphery of said structure, and comprising:
   a lower part, defined by a surface of revolution which is slanted downwardly and inwardly with respect to said structure;
   an upper part, defined by a surface of revolution which is slanted downwardly and outwardly with respect to said structure, the upper part comprising at least two surfaces of revolution having respective axes of revolution coplanar with a vertical plane containing the axis of revolution of said lower part, the respective axes of revolution of said surfaces having different inclinations with respect to the vertical;
   a plane of connection between the lower part and the upper part which plane substantially bisects the angle between the axes of revolution of said lower and upper parts; and
   another plane of connection between each two adjacent surfaces of said upper part which plane substantially bisects the angle between the axes of revolution of said adjacent surfaces.

2. An air cushion vehicle according to claim 1 wherein the members of revolution forming the upper part are cylindrical surfaces of the same radius.

3. An air cushion vehicle according to claim 1 wherein the members of revolution forming the upper part are frustoconical surfaces of the same conicity.

4. An air cushion vehicle according to claim 1 wherein each of the planes of connection intersects the structure to be lifted, thus being at least tangential to the floor of said structure.

5. An air cushion vehicle as in claim 1, in which said upper and lower parts are formed with flexible surfaces.

* * * * *